UNITED STATES PATENT OFFICE.

BENJAMIN N. PAYNE, OF CORNING, NEW YORK.

FOOD FOR CATTLE.

SPECIFICATION forming part of Letters Patent No. 234,718, dated November 23, 1880.

Application filed September 6, 1880. (Specimens.)

*To all whom it may concern:*

Be it known that I, BENJAMIN NOTT PAYNE, of Corning, in the county of Steuben and State of New York, have made an invention of a new article of manufacture which I denominate "Corn-Hay;" and I do hereby declare that the following is a full, clear, and exact description and specification of the same.

Previous to my invention it has been customary to convert the stalks and leaves of corn into food for animals by cutting the same crosswise of their length into short pieces, so that they could readily be taken into the mouth by cattle and other animals. This system of cutting is satisfactory as respects the leaves of the plant; but it leaves the stalks in short, hard, cylindrical fragments, which, from their cylindrical form, offer an obstruction to mastication.

My invention consists of the product produced by slitting or cutting the cornstalks longitudinally into strips or shreds, so that the cylindrical form of the stalk is practically obliterated, and the material is converted into a mass of longitudinal shreds, which can be handled as hay, can be readily masticated by animals, and which I denominate "corn-hay."

The following is the means which I have used to produce my manufacture, and which I propose to claim in another patent. A frame and trough similar to those of an ordinary cylinder straw-cutter are provided and are fitted near one end with a pair of feed-rollers, by means of which the stalks laid lengthwise in the trough can be moved endwise out of one of its ends. One or both of these feed-rollers is pressed toward the other with a yielding pressure, so as to accommodate the rollers to the greater or less quantity of material that is being fed through the machine. At the end of the trough, beyond the feed-rollers, there is a slitting-cylinder having disk-formed cutters, so arranged relatively to the feed-rollers that the stalks are forced by the feed-rollers against the edges of the disk-cutters, either above or below the shaft thereof. The disk-cutters are separated from each other by thin collars or washers, (say one-eighth of an inch thick, more or less,) so that the material which is slit by the cutters passes between them and falls from the machine. The slitting-cylinder works in connection with a plain guard-cylinder having a sear-face of rawhide or similar material set to touch the edges of the disk-cutters and of about the same diameter. This guard-cylinder prevents the cornstalks from escaping the cutters, and it and the slitting-cylinder are geared together by cog-wheels.

The disk-cutter cylinder and feed-rollers are connected by cog-gearing, so that they revolve simultaneously in the proper directions, and I prefer to cause the feed-cylinders to revolve with less superficial speed than the edges of the cutter-disks, so that the latter operate with a shearing or drawing cut.

The machine may be operated by power or by means of a crank and fly-wheel turned by hand.

The material produced as above described may subsequently be cut crosswise, as hay is cut, and in order that the material may be produced at one operation in this condition the machine may have the slitting-cylinder succeeded by the cutting apparatus of an ordinary straw-cutter, so that the stalks are first shredded, or slit into longitudinal shreds, and are then cut crosswise or chaffed.

I am aware that cornstalks have been crushed between rollers, but without the separation of the parts into filaments or shreds such as are produced by slitting the stalks, as above described.

I am also aware that cornstalks have been split into long straight splints suitable for weaving; but such splints, from their rigidity, do not correspond with my new manufacture; hence I do not claim crushed or splint cornstalks; but

What I claim is—

As a new article of manufacture, corn-hay consisting, substantially as above set forth, of cornstalks slit longitudinally into shreds.

In witness whereof I have hereto set my hand this 21st day of April, A. D. 1880.

B. N. PAYNE.

Witnesses:
E. C. POND,
W. E. PURDY.